United States Patent
Zhou et al.

(10) Patent No.: US 8,285,139 B2
(45) Date of Patent: Oct. 9, 2012

(54) METHOD, SYSTEM, AND APPARATUS FOR MANAGING ALARMS IN LONG-REACH PASSIVE OPTICAL NETWORK SYSTEM

(75) Inventors: Jianlin Zhou, Shenzhen (CN); Shimin Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 477 days.

(21) Appl. No.: 12/605,067

(22) Filed: Oct. 23, 2009

(65) Prior Publication Data

US 2010/0040363 A1   Feb. 18, 2010

Related U.S. Application Data

(63) Continuation of application No. PCT/CN2008/072461, filed on Sep. 23, 2009.

(30) Foreign Application Priority Data

Oct. 15, 2007   (CN) .......................... 2007 1 0163635

(51) Int. Cl.
   *H04B 10/08*   (2006.01)
(52) U.S. Cl. ............................... 398/17; 398/70; 398/71
(58) Field of Classification Search .............. 398/17–21, 398/66–72
   See application file for complete search history.

(56) References Cited

U.S. PATENT DOCUMENTS

| | | | |
|---|---|---|---|
| 6,023,467 A * | 2/2000 | Abdelhamid et al. ..... | 370/236.2 |
| 6,925,219 B2 | 8/2005 | Pfeiffer | |
| 7,283,748 B2 | 10/2007 | Jung et al. | |
| 2002/0097462 A1 * | 7/2002 | Koyano et al. ................ | 359/119 |
| 2002/0186439 A1 * | 12/2002 | Buabbud et al. .............. | 359/173 |
| 2007/0140689 A1 | 6/2007 | Haran | |
| 2008/0260378 A1 | 10/2008 | Khermosh | |
| 2009/0214222 A1 * | 8/2009 | Grossman et al. ............ | 398/173 |
| 2010/0119228 A1 * | 5/2010 | Zhou et al. ...................... | 398/66 |

FOREIGN PATENT DOCUMENTS

| | | |
|---|---|---|
| CN | 1474522 A | 2/2004 |
| CN | 1479460 A | 3/2004 |
| CN | 1578199 A | 2/2005 |
| CN | 1588950 A | 3/2005 |
| CN | 101047442 A | 10/2007 |
| CN | 101222278 A | 7/2008 |
| EP | 1841097 A2 | 10/2007 |

(Continued)

OTHER PUBLICATIONS

International Search Report in corresponding PCT Application No. PCT/CN2008/072461 (Dec. 25, 2008).

(Continued)

*Primary Examiner* — Dzung Tran
(74) *Attorney, Agent, or Firm* — Leydig, Voit & Mayer, Ltd.

(57) ABSTRACT

A method, system and apparatus for managing alarms in a Long Reach Passive Optical Network (LR-PON) system are disclosed. The method includes: obtaining a PON signal from an Optical Line Terminal (OLT) or an Optical Network Unit (ONU) on one side; checking whether the obtained PON signal fails; and notifying the ONU or the OLT on the other side if the PON signal fails. The method, system and apparatus under the present invention monitor the LR-PON transmission quality and process various alarm indications raised in the LR-PON signal monitoring.

12 Claims, 13 Drawing Sheets

FOREIGN PATENT DOCUMENTS

EP    1887717 A1    2/2008

OTHER PUBLICATIONS $2^{nd}$ Office Action in corresponding European Application No. 08800950.1 (Oct. 20, 2011).

"100 Mbit/s point to point Ethernet based optical access system; G.985 (03/03)" ITU-T Standard in Force (I), International Telecommunication Union, Geneva, CH, No. G.985 ( 03/03), Mar. 16, 2003, XP017401199 Section 7.2 to 7.4.

Darren P. Shea et al, "Long-Reach Optical Access Technologies", IEEE Network, IEEE Service Center, New York, NY, US, vol. 21, No. 5, Sep. 1, 2007, pp. 5-11, XP011192382, ISSN: 0890-8044.

Angel Molina Lucent Technologies Network Systems Germany: "Draft revised Recommendation G.783 (for consent); TD 54" ITU-T draft Study Period 2001-2004, International Telecommunication Union, Geneva; CH, Oct. 21, 2003, pp. 1-58, 281-288, XP002557597 Appendix I.

Written Opinion of the International Searching Authority in corresponding PCT Application No. PCT/CN2008/072461 (Dec. 25, 2008).

* cited by examiner

METHOD, SYSTEM, AND APPARATUS FOR MANAGING ALARMS IN LONG-REACH PASSIVE OPTICAL NETWORK SYSTEM

CROSS-REFERENCE TO RELATED APPLICATIONS

This application is a continuation of International Application No. PCT/CN2008/072461, filed on Sep. 23, 2008, which claims the benefit of Chinese Patent Application No. 200710163635.3, filed on Oct. 15, 2007, both of which are hereby incorporated by reference in their entireties.

FIELD OF THE INVENTION

The present invention relates to a Passive Optical Network (PON) technology, and in particular, to a method, system and apparatus for managing alarms in a Long-Reach PON (LR-PON) system.

BACKGROUND OF THE INVENTION

Currently, with the emergence of the services such as Video on Demand (VOD), High-Definition Television (HDTV) and online gaming, telecom users raise higher and higher requirements on network bandwidth. Driven by such requirements, the Fiber to the Home (FTTH) technology that ensures the "last mile" access network is developing rapidly, and especially, the PON technology is applied widely.

FIG. 1 shows a structure of a traditional PON system. A traditional PON system is composed of an Optical Line Terminal (OLT), more than one Optical Network Unit (ONU), and an Optical Distribution Network (ODN) that connects the ONU to the OLT. The ODN includes a passive optical splitter for distributing optical power, a feed fiber between the passive optical splitter and the OLT, and a branch fiber between the passive optical splitter and the ONU. In a traditional PON system, the OLT covers the ONUs that are not over 20 km away.

Monitoring and maintenance of a traditional PON system are illustrated in FIG. 2. FIG. 2 shows alarm links in a PON system in the prior art. The PON system provides three types of Operations, Administration and Maintenance (OAM) channels: embedded OAM, Physical Layer OAM (PLOAM), and Operation and Maintenance Center (OMC). In FIG. 2, the Bit Interleaved Parity (BIP) and Remote Defect Indication (RDI) messages are transmitted through embedded OAM bits or bytes, and the Remote Error Indication (REI) and Deactivate (DACT) messages are transmitted in the form of PLOAM messages.

In a traditional PON system, the OLT is interconnected with the ONU directly through an optical splitter. As shown in FIG. 2, in both the upstream and the downstream directions, failure detection is performed for fiber links and reported by raising alarms such as Loss of Signal (LOS) alarms and Loss of Frame (LOF) alarms; and data transmission performance is detected through BIP check and reported by raising alarms such as Signal Degrade (SD) alarms and Signal Fail (SF) alarms. The result of performance monitoring in the downstream direction is returned to the OLT through RDI and REI messages to facilitate the OLT check and failure locating.

With the emergence of the next-generation optical access network, the LR-PON is proposed. The LR-PON needs to reach farther and enable the OLT to cover the ONUs 100 km away. FIG. 3 shows a structure of an LR-PON system in the prior art. As shown in FIG. 3, the LR-PON includes an OLT, a regenerator, more than one ONU, and an ODN1 and an ODN2 which are located on both sides of the regenerator. The ODN1 connects the regenerator to the OLT, and includes a feed fiber. The ODN2 connects the regenerator to the ONU, and includes: a passive optical splitter, a feed fiber between the passive optical splitter and the regenerator, and a branch fiber between the passive optical splitter and the ONU. By adding a regenerator in the LR-PON system, the OLT in the LR-PON system covers the ONUs up to 100 km away. Through an Electrical Relay (E-R) regenerator in the prior art, the coverage of the PON can be extended in E-R mode.

Although the E-R regenerator extends the coverage of the PON and enables the OLT to cover ONUs as far as required, long-distance fiber failures may arise after the fiber transmission distance is extended from 20 km to 100 km. The active E-R device introduced into the PON also reduces the stability and reliability of the device in the system. The E-R regenerator on the feed fiber divides the Fiber path into two sections, which increases the complexity of fast failure locating. The existing PON system provides complete monitoring and maintenance functions and specifies various alarm indications, performance events and management operations between the OLT and the ONU in detail, but such functions are applicable only to the scenarios where the OLT interworks with the ONU directly through optical signals in the traditional PON system. In the E-R LR-PON application, the E-R regenerator does not perform necessary monitoring or processing for the PON signals. Previous alarm indications and maintenance functions are transmitted transparently, and the failures of the intermediate nodes cannot be analyzed or located. Therefore, the existing E-R LR-PON solution does not monitor the LR-PON signals, and does not put forward various alarm indications raised in the LR-PON signal monitoring or the corresponding processing method.

SUMMARY OF THE INVENTION

A method for managing alarms in an LR-PON system is provided in an embodiment of the present invention to monitor the LR-PON transmission quality and to process various alarm indications raised in the LR-PON signal monitoring.

A system for managing alarms in an LR-PON system is provided in an embodiment of the present invention to monitor the LR-PON transmission quality and to process various alarm indications raised in the LR-PON signal monitoring.

An E-R regenerator is provided in an embodiment of the present invention to monitor the LR-PON transmission quality and to raise alarms for different failures.

The technical solution under the present invention is implemented in the following way:

A method for managing alarms in an LR-PON system includes:

obtaining a PON signal from an OLT or an ONU on one side; checking whether the obtained PON signal fails; and notifying the ONU or the OLT on the other side if the PON signal fails.

A system for managing alarms in an LR-PON system includes:

a first PON apparatus, adapted to send a PON signal to an E-R regenerator;

the E-R regenerator, adapted to: obtain the PON signal from the first PON apparatus, check whether the obtained PON signal fails, and notify a second PON apparatus if the PON signal fails; and the second PON apparatus, adapted to: judge and locate the failure according to the received notification and take a corresponding action.

An E-R regenerator includes:

a detecting module, adapted to: check whether a PON signal from a first PON apparatus fails, and notify an alarm module to send an alarm to a second PON apparatus if the PON signal fails; and the alarm module, adapted to send an alarm to the second PON apparatus according to the received notification.

Through the method, system and apparatus disclosed herein, the alarm detection function is added in the E-R regenerator, and the detected alarm signal is transmitted to the OLT or ONU, so that the OLT can analyze, judge and locate the failure and can distinguish the alarm level, thus facilitating device maintenance. In this way, the LR-PON transmission quality is monitored, and various alarm indications in the LR-PON signal monitoring are processed properly.

BRIEF DESCRIPTION OF THE DRAWINGS

FIG. 12 shows a structure of an E-R regenerator according to the third embodiment of the present invention.

DETAILED DESCRIPTION OF THE EMBODIMENTS

Figure 1:
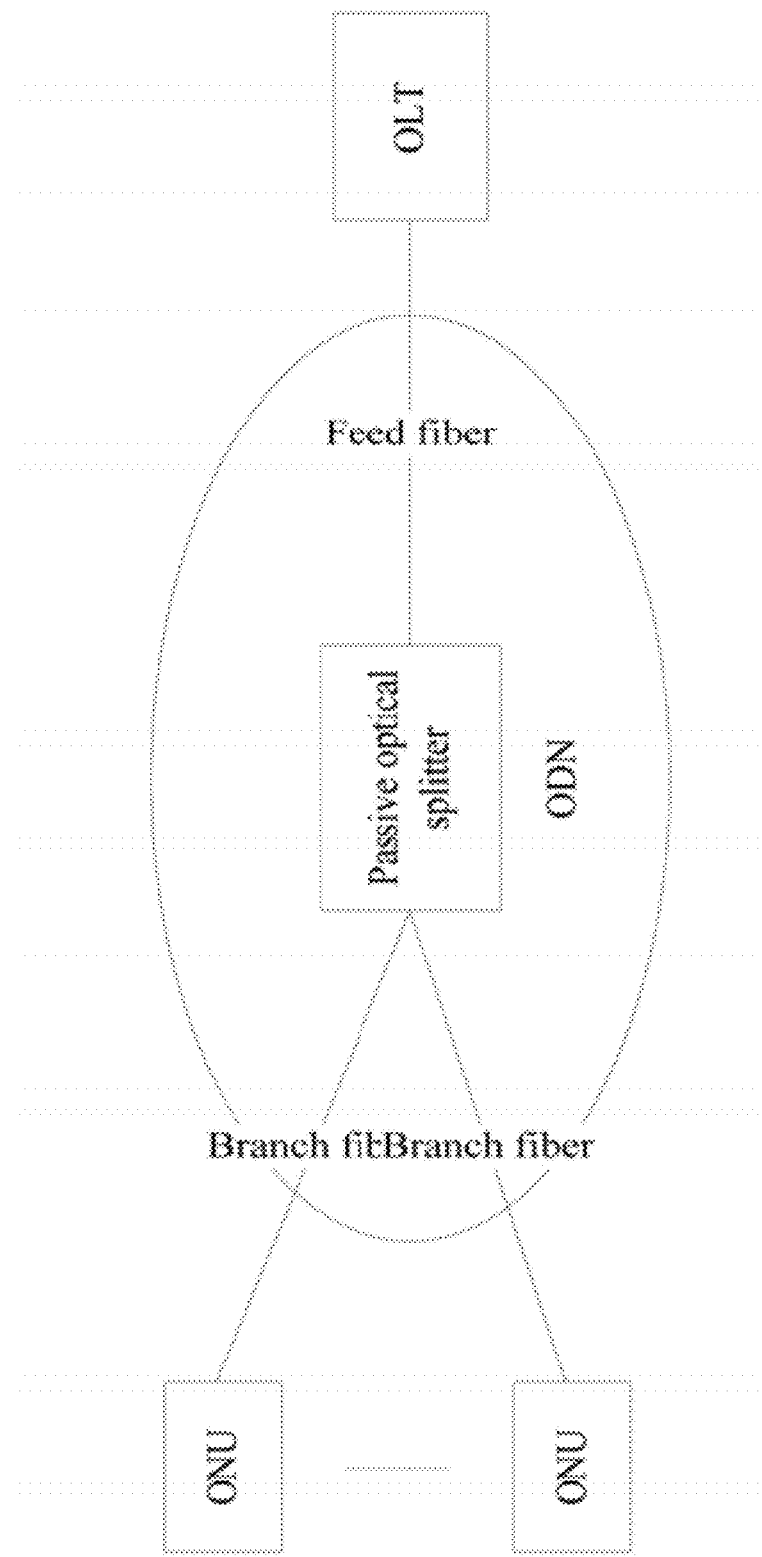
FIG. 1 shows a structure of a traditional PON system.
Figure 2:
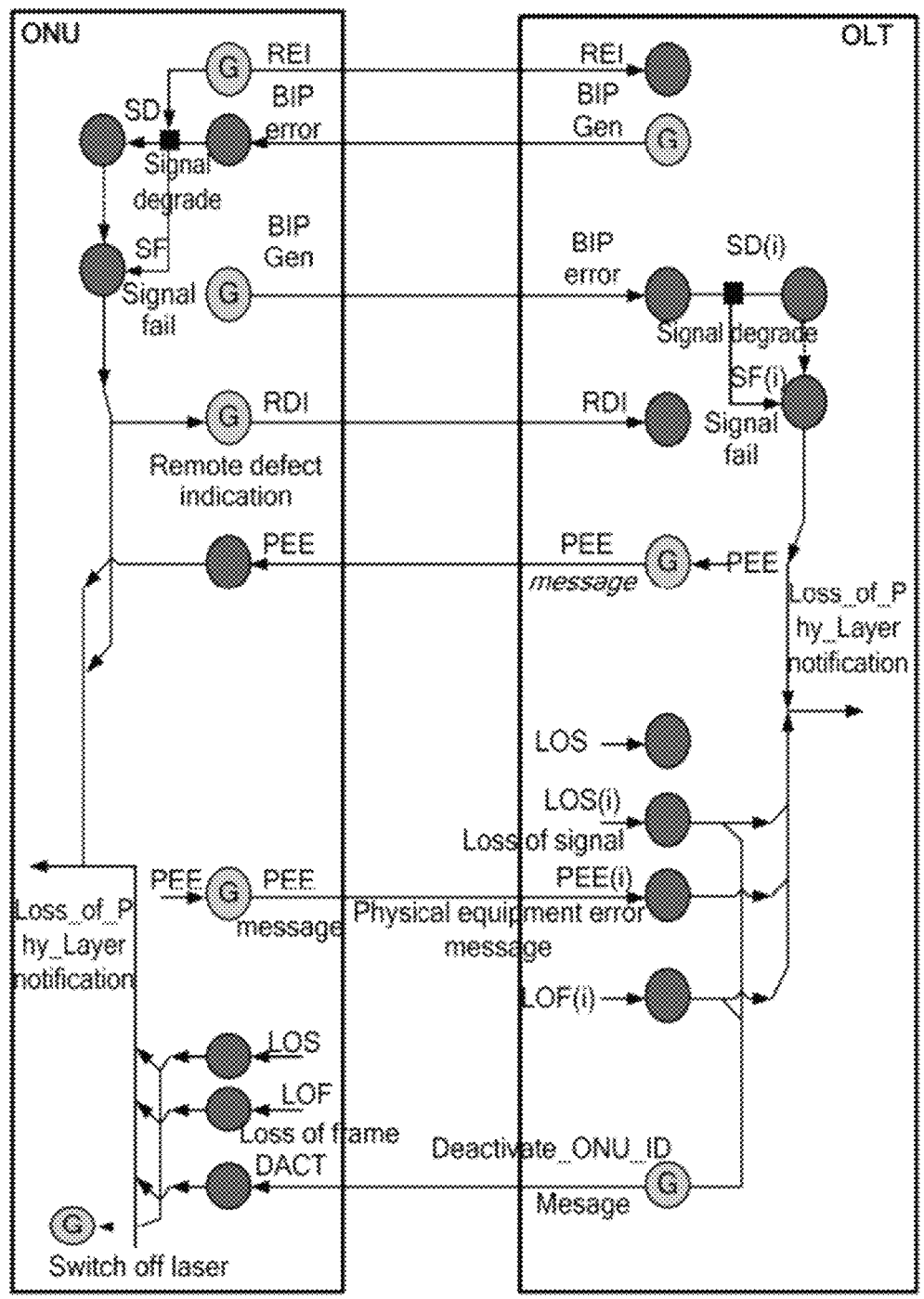
FIG. 2 shows alarm links in a PON system in the prior art.
Figure 3:
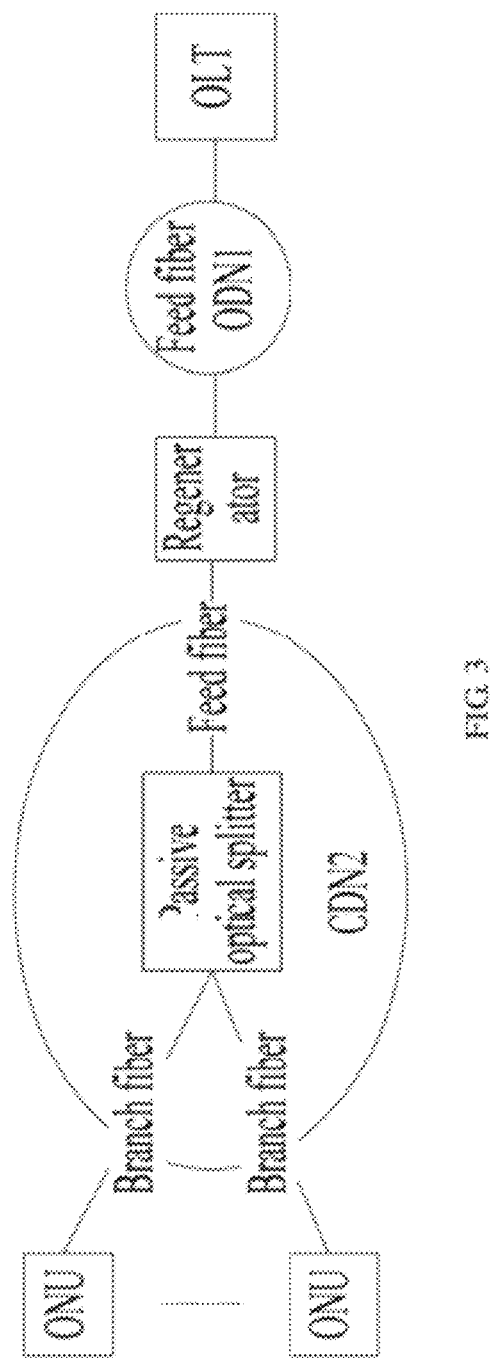
FIG. 3 shows a structure of an LR-PON system in the prior art.

To make the technical solution, objectives and merits of the present invention clearer, the following describes the present invention in detail with reference to accompanying drawings and exemplary embodiments.

A method for managing alarms in an LR-PON system is provided in an embodiment of the present invention. The method includes:

obtaining a PON signal from an OLT or an ONU on one side; checking whether the obtained PON signal fails; and notifying the ONU or the OLT on the other side if the PON signal fails.

The method may further include:

by the ONU or the OLT on the other side, judging and locating the failure according to the received notification and taking a corresponding action.

In the following embodiment, alarm detection is added in the E-R regenerator. After detecting an alarm, the E-R regenerator generates an alarm signal, and sends the generated alarm signal to the ONU or the OLT, so that the ONU or the OLT on the other side knows that the obtained signal fails. To facilitate failure analysis and alarm management of the OLT, the traditional ONU and OLT need to be modified. Table 1 shows failure judgment and locating performed by the OLT for various alarm signals in this embodiment.

TABLE 1

| Alarm Type | | Alarm Check Point | New Alarm or Existing Alarm | Failure Analysis | Failure Path | Failure Type |
|---|---|---|---|---|---|---|
| RDI | Remote (ONU) received downstream data defect indication | The ONU detects the alarm and sends it back to the OLT. | Existing alarm | If RDI = 0, no defect exists in the data on the whole downstream path from the OLT to the ONU; If RDI = 1, a defect exists in the data on the downstream path from the OLT to the ONU. | If RDI = 0 and RDIu = 0, data is normal on the whole downstream path from the OLT to the ONU; If RDI = 1 and RDIu = 0, a defect exists on the downstream path from the E-R to the ONU; If RDI = 1 and RDIu = 1, a defect exists on the downstream path from the OLT to the E-R, or a defect also exists on the downstream path from the E-R to the ONU; If RDI = 0 and RDIu = 1, it is a mistaken report. | When both failure detection and performance monitoring are available in the E-R, the combination of RDI and RDIu indicates only a performance defect. |
| RDIu | Remote (E-R) received downstream data defect indication | OLT | New alarm | If RDIu = 0, no defect exists in the data on the downstream path from the OLT to the E-R; If RDIu = 1, a defect exists in the data on the downstream path from the OLT to the E-R. | | |
| | Remote (E-R) received downstream | OLT | New alarm | An LOS or LOF alarm exists in the downstream data received by | Downstream direction from the OLT to the E-R. | When only failure detection is available, |

TABLE 1-continued

| Alarm Type | Alarm Check Point | New Alarm or Existing Alarm | Failure Analysis | Failure Path | Failure Type |
|---|---|---|---|---|---|
| | data failure indication | | | the E-R from the OLT. | | this alarm indicates a major alarm. |
| AISd back-transmitted alarm | Alarm inserted by E-R to ONU | The ONU detects the alarm and sends it back to the OLT. | New alarm | An LOS or LOF alarm exists in the downstream data received by the E-R from the OLT. | Downstream direction from the OLT to the E-R. | Major alarm. |
| SDi/ SFi | Upstream signal degrade/ failure alarm | OLT | Existing alarm | If SDi = 0 and SFi = 0, no defect exists in the data on the whole upstream path from the ONU to the OLT; If SDi = 1 or SFi = 1, a defect exists in the data on the upstream path from the ONU to the OLT. | If SDi = 0 and SFi = 0, and RDId = 0, data is normal on the whole upstream path from the ONU to the OLT; If SDi = 1 or SFi = 1, and RDId = 0, a defect exists on the upstream path from the E-R to the OLT; If SDi = 1 or SFi = 1, and RDId = 1, a defect exists on the upstream path from the ONU to the E-R; or, a defect also exists on the upstream path from the E-R to the OLT; If SDi = 0 and SFi = 0, and RDId = 1, it is a mistaken report. | When both failure detection and performance monitoring are available in the E-R, the combination of SDi/SFi and RDId indicates only a performance defect. |
| RDId back-transmitted alarm | Remote (E-R) received ONU upstream data defect indication | The ONU detects the alarm and sends it back to the OLT. | New alarm | If RDId = 0, no defect exists in the data on the upstream path from the ONU to the E-R; If RDId = 1, defects exist in the data on the upstream path from the ONU to the E-R | | |
| | Remote (E-R) received ONU upstream data failure indication | The ONU detects the alarm and sends it back to the OLT. | New alarm | An LOS or LOSi or LOFi alarm exists in the upstream data received by the E-R. | Upstream direction from the ONU to the E-R. | When only failure detection is available, this alarm indicates a major alarm. |
| LOS | Loss of signal | OLT | Existing alarm | Loss of signal occurs in the whole upstream data stream received by the OLT. | Upstream direction from the E-R to the OLT. | Major alarm. |
| AISu | Alarm inserted by E-R to OLT | OLT | New alarm | Loss of signal occurs in the whole upstream data stream received by the E-R. | Upstream direction from the ONU to the E-R. | Major alarm. |
| LOSi/ LOFi | Loss of signal or frame of $ONU_i$ in the upstream direction | OLT | Existing alarm | Loss of signal or frame occurs in the data of $ONU_i$ received in the upstream direction by the OLT. | Upstream direction from the E-R to the OLT. | Major alarm. |
| AISi | Alarm inserted by E-R to $ONU_i$ | OLT | New alarm | Loss of signal and loss of frame occur in the data of $ONU_i$ received in the upstream direction by the E-R. | Upstream direction from $ONU_i$ to the E-R. | Major alarm. |

After receiving the alarm signal, the OLT determines which side of the fiber path fails and the type of the failure according to the method of failure judgment and locating shown in Table 1.

After receiving the alarm signal, the OLT or the ONU needs to take a corresponding action to process the alarm signal. Table 2 shows how an OLT processes a new alarm signal, and Table 3 shows how an ONU processes a new alarm signal according to an embodiment of the present invention.

Upstream Direction:

After detecting the LOS alarm, the E-R regenerator switches off the transmitting laser in the upstream direction, so that the OLT detects the LOS alarm in the upstream direction. The subsequent processing is the same as that in the prior art. After knowing that the LOS alarm is cleared, the E-R regenerator switches on the transmitting laser in the upstream direction again.

TABLE 2

| Alarm Type | | Detection Conditions | Actions | Cancellation Conditions |
|---|---|---|---|---|
| AISu | Alarm frame inserted for the whole upstream data stream | A data stream compliant with the AISu alarm frame format is detected. | Suppress the LOSi, LOFi, and AISi alarms. | A data stream incompliant with the AISu alarm frame format is detected. |
| AISi | Alarm frame inserted for $ONU_i$ | For the data frame of $ONU_i$, a data stream compliant with the AISi alarm frame format is detected. | Suppress the LOFi alarm. | For the data frame of $ONU_i$, a data stream incompliant with the AISi alarm frame format is detected. |
| RDIu | Remote defect indication | When the value of the physical overhead area RDIu of the upstream data frame of the ONU is 1, it indicates that a defect exists in the data sent by the OLT to the E-R regenerator in the downstream direction. | Recover the downstream interface processing unit of the OLT. | The value of RDIu is 0. |

TABLE 3

| Alarm Type | | Detection Conditions | Actions | Cancellation Conditions |
|---|---|---|---|---|
| AISd | Alarm inserted for all ONUs in the downstream direction | A data stream compliant with the AISd alarm frame format is detected. It indicates that the failure occurs on the path from the OLT to the E-R regenerator in the downstream direction. | Suppress the LOF alarm. | A data stream incompliant with the AISd alarm frame format is detected. |
| RDId | Remote defect indication | When the value of the physical overhead area RDId of the downstream data frame of the OLT is 1, it indicates that a defect exists in the data sent by the ONU to the E-R regenerator in the upstream direction. | Recover the upstream interface processing unit of the ONU. | The value of RDId is 0. |

First Embodiment

Figure 4:
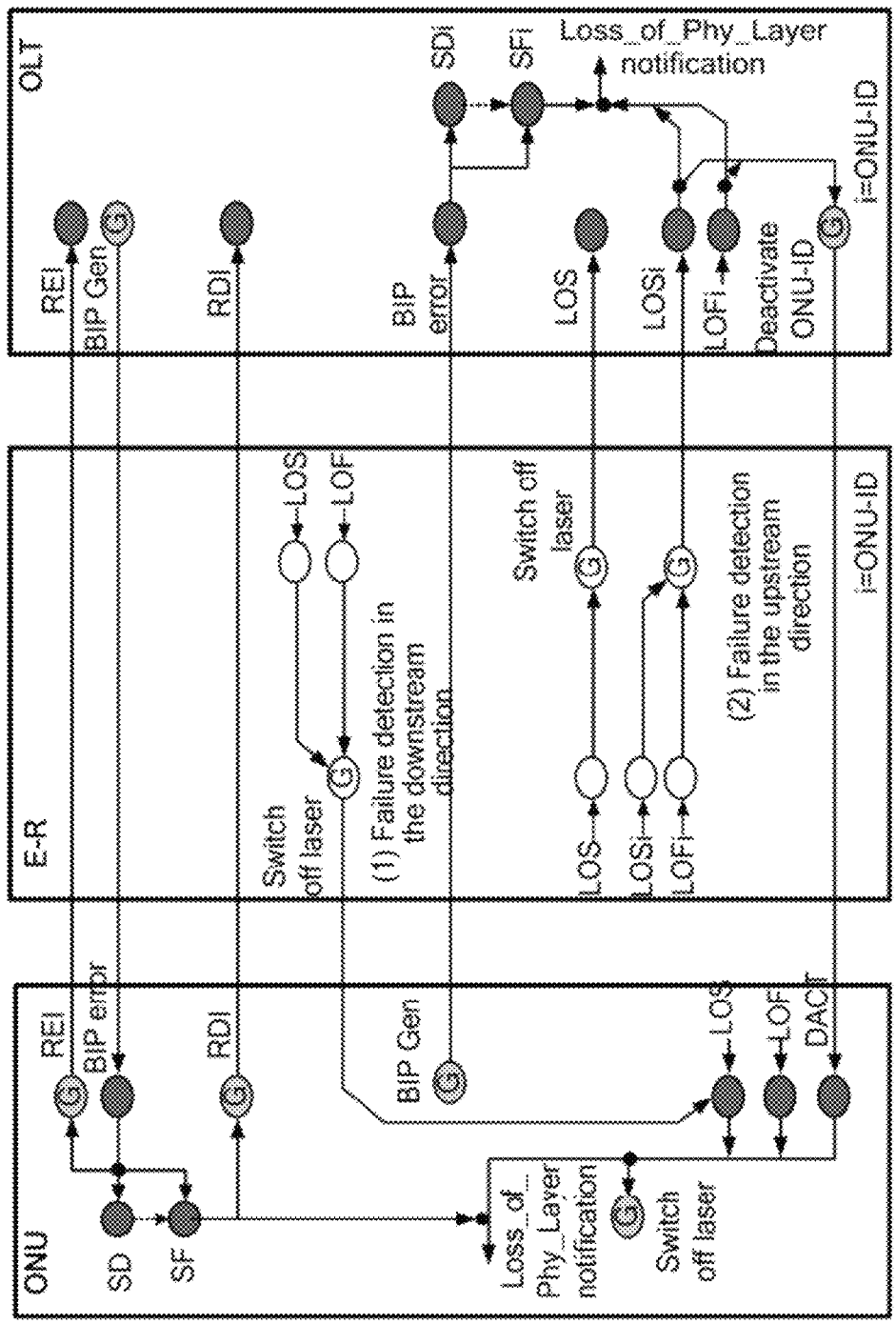
FIG. 4 shows alarm links according to a first embodiment of the present invention.

FIG. 4 shows alarm links according to the first embodiment of the present invention. In this embodiment, alarm detection functions are added only to the E-R generator, and the ONU and the OLT remain unchanged.

Downstream Direction:

After detecting an LOS or LOF alarm, the E-R regenerator switches off the transmitting laser in the downstream direction, so that the ONU detects the LOS alarm in the downstream direction. The subsequent processing is the same as that in the prior art; that is, the ONU determines that an LOS failure occurs on the downstream path from the E-R regenerator to the ONU. After knowing that the LOS alarm and the LOF alarm are cleared, the E-R regenerator switches on the transmitting laser in the downstream direction again.

The E-R regenerator performs detection and frame alignment for the electrical signal which is obtained through optical-to-electrical (O/E) conversion of the PON upstream optical signal from the ONU, and judges whether LOS or LOF occurs in the upstream data sent by the ONU. If LOS or LOF occurs in the upstream data sent by the ONU, the E-R regenerator transmits the LOSi alarm to the OLT transparently so that the OLT detects the LOSi alarm. The subsequent processing on the OLT is the same as that in the prior art.

Evidently, the solution under the present invention is simple, and is compatible with the existing functions of the ONU and the OLT in the prior art.

Second Embodiment

Figure 5:
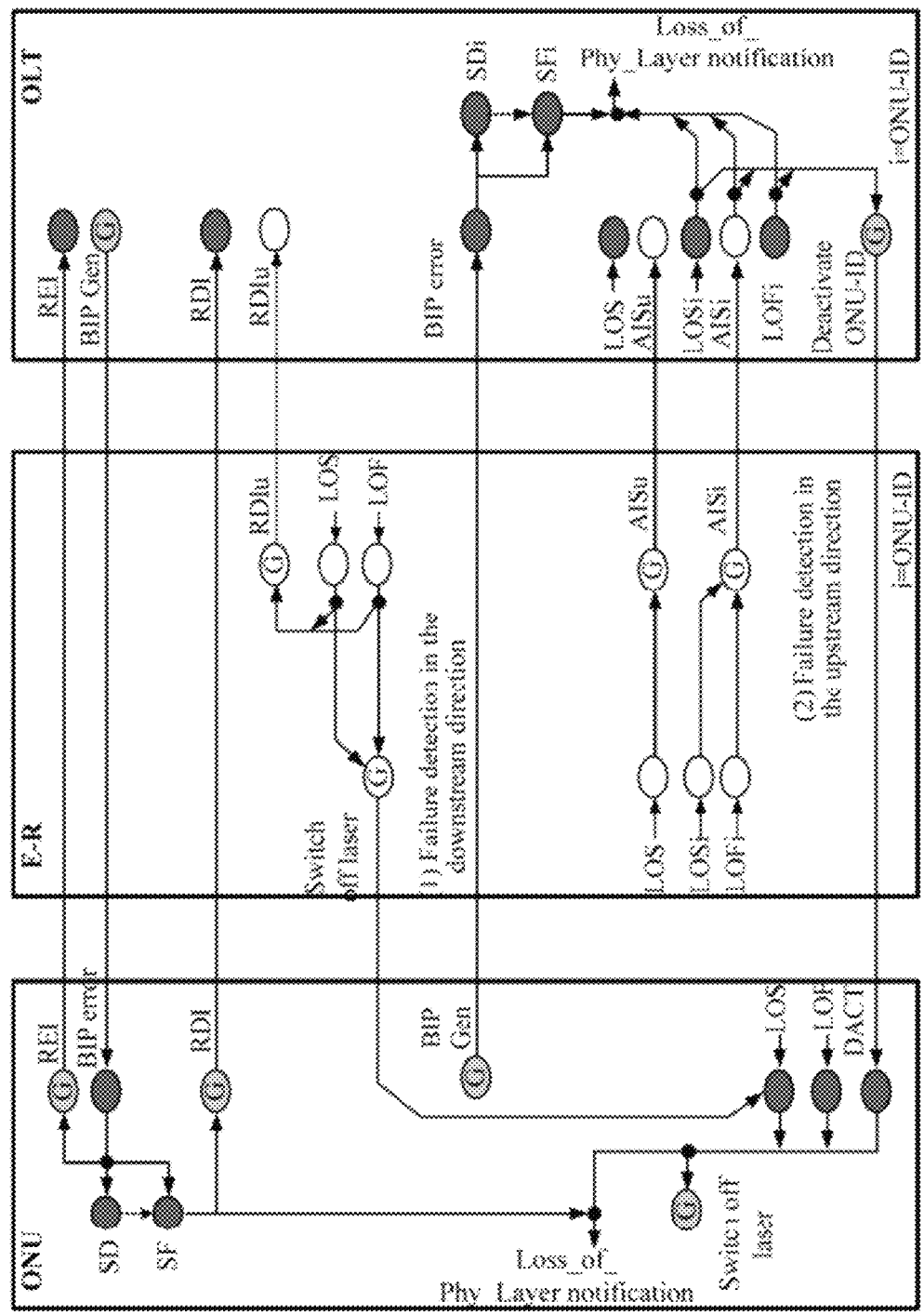
FIG. 5 shows alarm links according to a second embodiment of the present invention.

FIG. 5 shows alarm links according to the second embodiment of the present invention. The features that make this embodiment different from the first embodiment are as follows: An alarm back-transmission function is added to the E-R regenerator; the OLT can detect and process three additional types of alarms to facilitate failure judgment and locating; and the ONU remains unchanged.

Downstream Direction:

After detecting the LOS and LOF alarms, the E-R regenerator switches off the transmitting laser in the downstream direction, the details of which are the same as those of the first embodiment and are provided further.

After detecting the LOS and LOF alarms, the E-R regenerator sends the set third-type downstream Alarm Indication Signal (AIS) back to the OLT. Here the third-type downstream AIS is an RDIu alarm.

As shown in Table 1, after receiving the RDIu alarm, the OLT determines that a failure leading to LOS or LOF occurs on the downstream path from the OLT to the E-R regenerator. As shown in Table 2, a recovery operation is performed for the downstream interface processing unit of the OLT.

Figure 6:
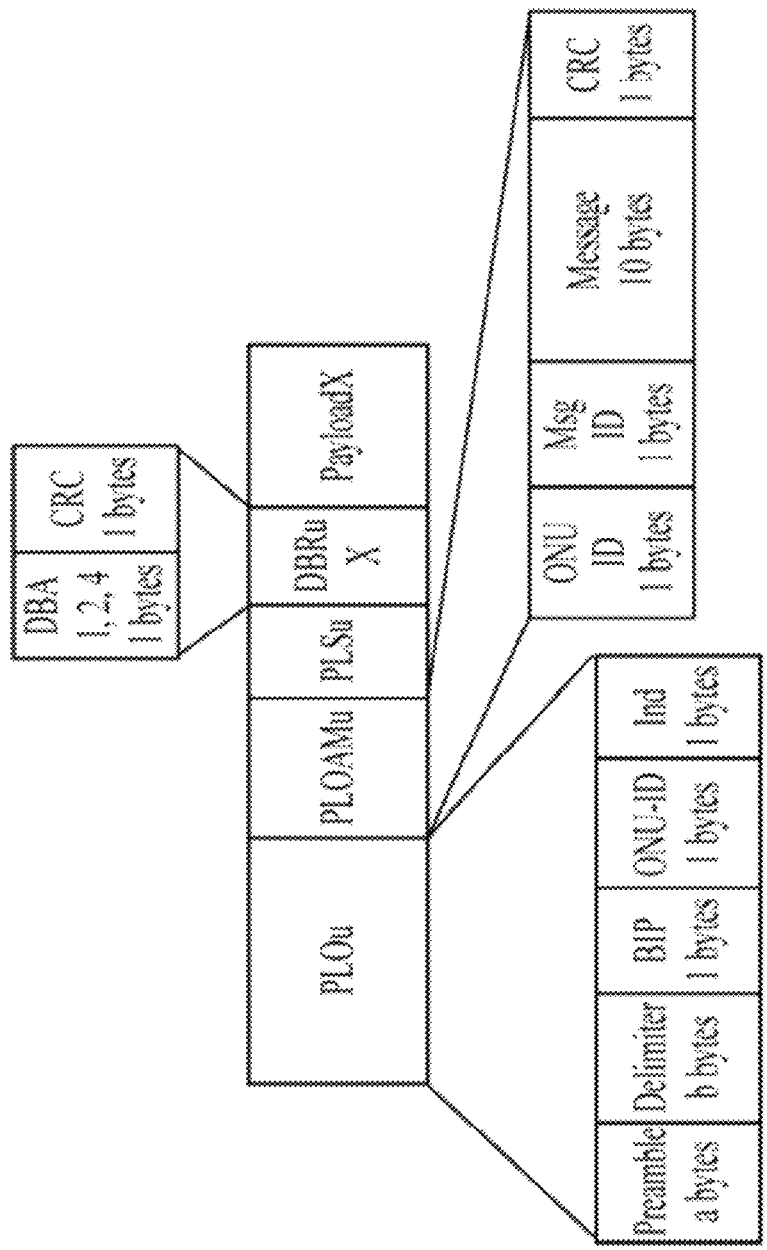
FIG. 6 shows a structure of an upstream frame in a GPON according to an embodiment of the present invention.

In the foregoing step, the E-R regenerator may send back the RDIu through idle bits in a PON upstream frame. FIG. 6 shows a structure of an upstream frame according to a GPON in an embodiment of the present invention. In the upstream frame of the GPON, bit 0 in the real time state indication (Ind) field in the Physical Layer Overhead upstream (PLOu) field is idle, and may serve as a back-transmission indication of the RDIu alarm. Table 4 shows functions of the bits in the Ind field in the PLOu field of the GPON upstream frame.

TABLE 4

| Bit | Function |
| --- | --- |
| 7 (MSB) | PLOAMu emergent message waiting indication in the upstream direction (1 = emergent message waiting; 0 = no emergent message waiting) |
| 6 | FEC state (1 = FEC; 0 = no FEC) |
| 5 | RDI state (1 = defective; 0 = normal) |
| 4 | Traffic waiting in type 2 T-CONTs |
| 3 | Traffic waiting in type 3 T-CONTs |
| 2 | Traffic waiting in type 4 T-CONTs |
| 1 | Traffic waiting in type 5 T-CONTs |
| 0 (LSB) | Reserved bit. This bit may indicate the RDIu state in the LR-PON (1 = defective; 0 = normal) |

Upstream Direction:

After detecting the LOS alarm, the E-R regenerator inserts the set first-type upstream AIS to the OLT. The first-type upstream AIS is an AISu alarm.

As shown in Table 1, after receiving the AISu alarm, the OLT determines that a failure leading to LOS occurs on the upstream path from the ONU to the E-R regenerator. As shown in Table 2, the OLT suppresses the LOSi, LOFI, and AISi alarms.

Further, after detecting the LOSi and LOFi alarms, the E-R regenerator inserts the set second-type upstream AIS to the OLT. The second-type upstream AIS is an AISi alarm.

As shown in Table 1, after receiving the AISi alarm, the OLT determines that a failure leading to LOS or LOF in the upstream data of the ONU occurs on the upstream path from $ONU_i$ to the E-R regenerator. As shown in Table 2, the OLT suppresses the LOFi alarm.

In the foregoing step, the inserted AISu and AISi alarms are "alarm frames". Their frame header is similar to the pattern format of the upstream frame delimiter "a byte" and "b byte" of the GPON. A simple mode is to fill the upstream data with "a byte" and "b byte" to make a new alarm signal without frame boundary, which facilitates the OLT to detect, distinguish and suppress the LOS, LOSi, and LOFi alarms.

Third Embodiment

Figure 7:
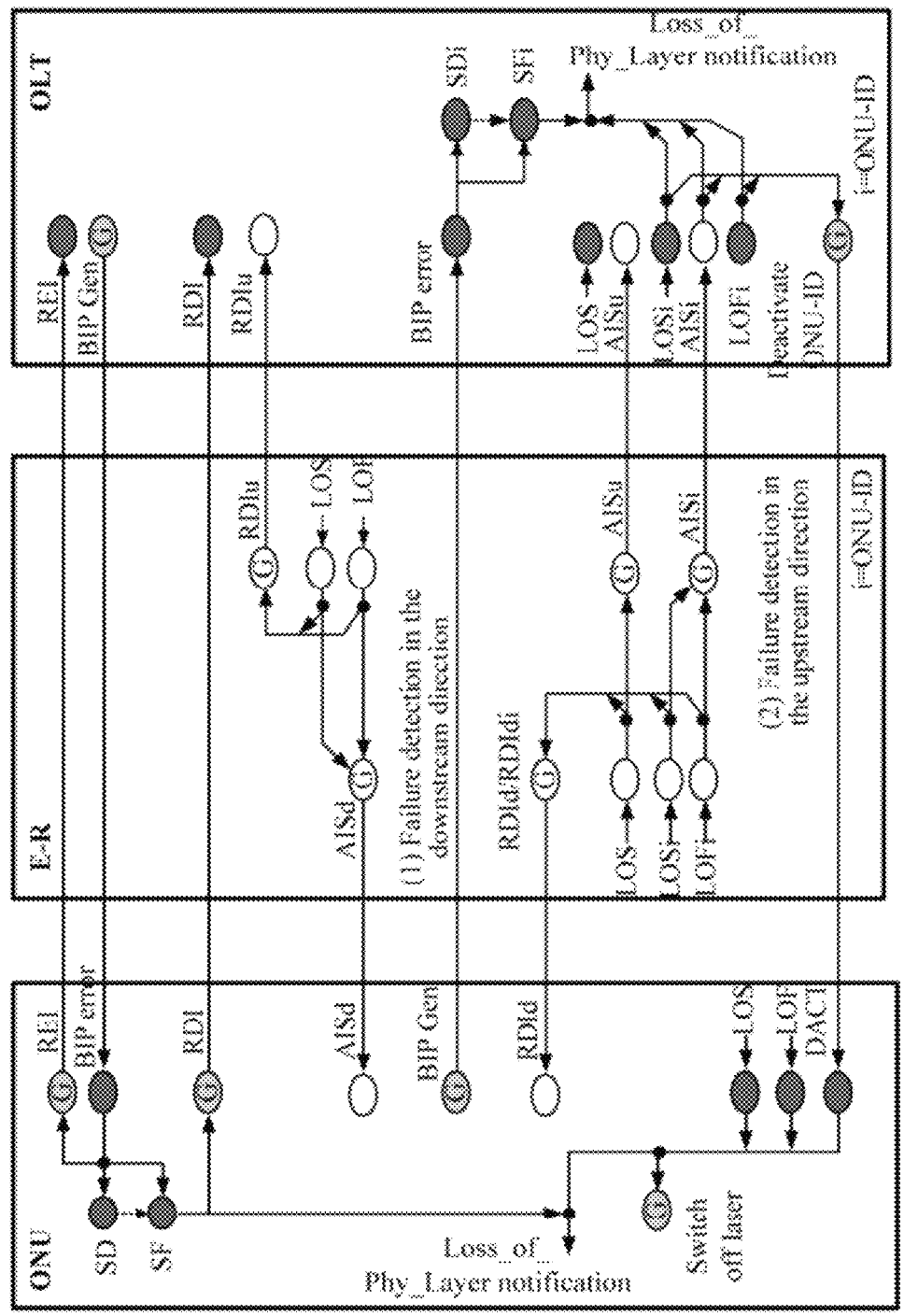
FIG. 7 shows alarm links according to a third embodiment of the present invention.

FIG. 7 shows alarm links according to the third embodiment of the present invention. The features that make this embodiment different from the second embodiment are as follows: One more alarm back-transmission function is added to the E-R regenerator, and the ONU can detect and process two additional types of alarms.

Downstream Direction:

After detecting the LOS and LOF alarms, the E-R regenerator does not switch off the transmitting laser in the downstream direction, but inserts the first-type downstream AIS to the ONU. The first-type downstream AIS is an AISd alarm.

After receiving the AISd alarm, the ONU determines that a failure leading to LOS or LOF occurs on the downstream path from the OLT to the E-R regenerator. As shown in Table 3, the ONU suppresses the LOF alarm.

In the foregoing step, the inserted AISd alarm is an "alarm frame". Its frame header is similar to the pattern format of the downstream frame delimiter "PSync" of the GPON. A simple mode is to fill the downstream data with "PSync" characters to make a new alarm signal without frame boundary, which facilitates the downstream ONU to detect, distinguish and suppress the LOS and LOF alarms.

Upstream Direction:

Unlike the practice in the second embodiment, after detecting the LOS alarm of the whole upstream data stream, the E-R regenerator sends the set third-type upstream AIS back to all ONUs, where the third-type upstream AIS is an RDId alarm. After detecting the LOSi and LOFi alarms of the upstream data of the ONU, the E-R regenerator sends the set third-type upstream AIS back to the corresponding ONU. The third-type upstream AIS is an RDIdi alarm.

After receiving the RDId alarm, the ONU determines that a failure occurs on the upstream path from the ONU to the E-R regenerator and this failure leads to LOS of the whole data stream or leads to LOS or LOF in the upstream data sent by the corresponding ONU.

Figure 8:
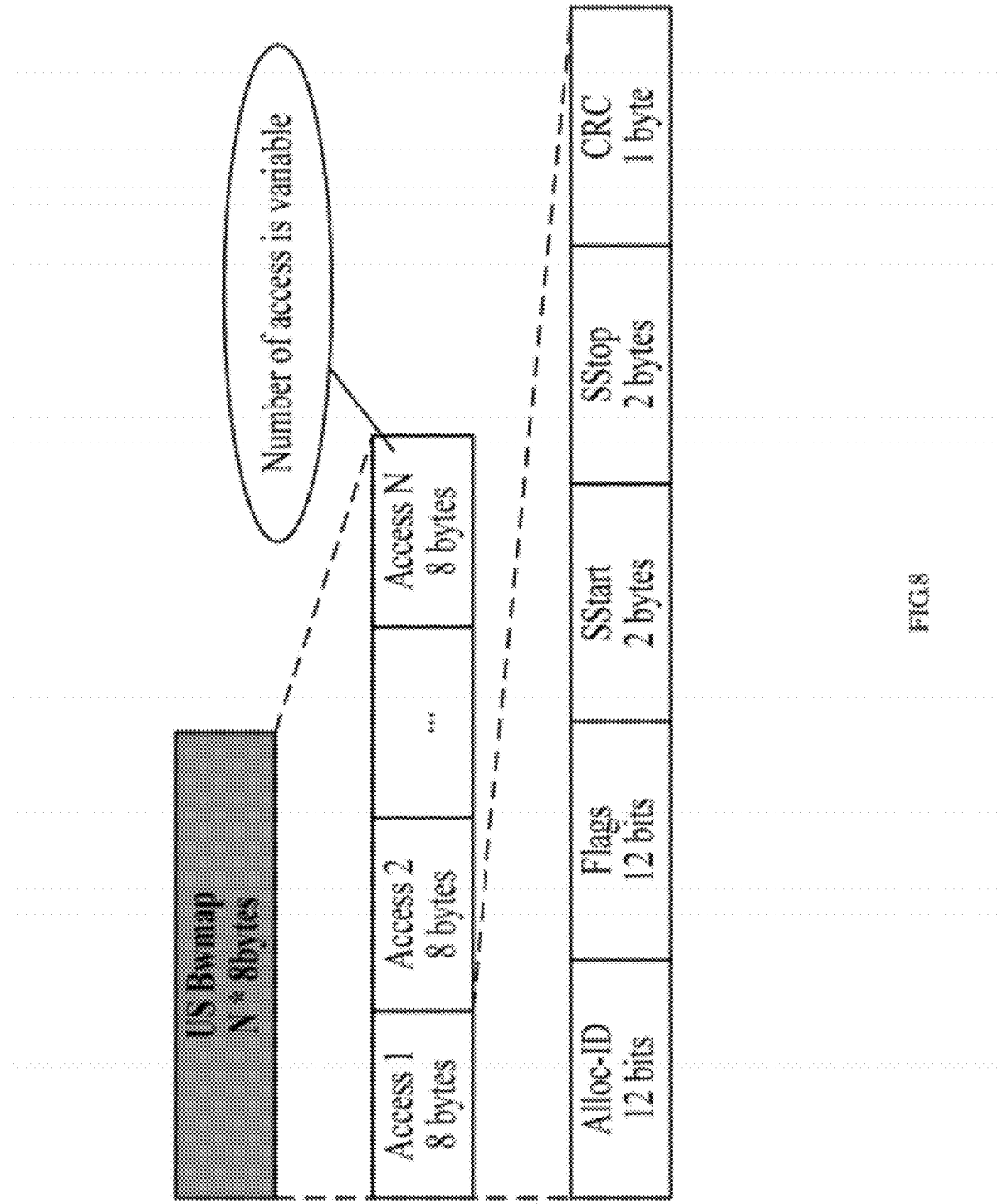
FIG. 8 shows an UpStream BandWidth Map (US BW Map) structure in a Physical Control Block downstream (PCBd) overhead field in a GPON according to an embodiment of the present invention.

In the foregoing step, the E-R regenerator may send back the RDId through idle bits in the PON downstream frame. FIG. 8 shows an US BW Map structure in a PCBd overhead field in a GPON in an embodiment of the present invention. In the downstream frame of the GPON, the US BW Map in the PCBd overhead field is composed of 8-byte vector groups. Each vector group has a flag field, and the functions of the bits in the flag field are described in Table 5. In the existing GPON, bits 0-6 are idle. One of the bits may be selected to indicate whether to allow the ONU to process new alarms, and another bit is selected as an RDId back-transmitted alarm.

TABLE 5

| Bit | Function |
| --- | --- |
| 11 (MSB) | An indication of sending a PLSu (1 = allow ONU to send PLSu; 0 = not allow ONU to send PLSu) |
| 10 | An indication of sending a PLOAMu (1 = allow ONU to send PLOAMu; 0 = not allow ONU to send PLOAMu) |
| 9 | An indication of using an FEC (1 = allow ONU to insert FEC; 0 = not allow ONU to send FEC) |
| 8, 7 | Mode of sending DBRu (00 = not send DBRu; 01 = allow ONU to send mode-0 DBRu; 10 = allow ONU to send mode-1 DBRu; 11 = allow ONU to send mode-2 DBRu) |
| 6 | Reserved bit. In the LR-PON, this bit may indicate whether to allow the ONU to process new alarms (1 = allow; 0 = not process) |

TABLE 5-continued

| Bit | Function |
|---|---|
| 5 | Reserved bit. This bit may indicate the RDId alarm in the LR-PON (1 = defective; 0 = normal) |
| 4-0 | Reserved |

Fourth Embodiment

Figure 9:
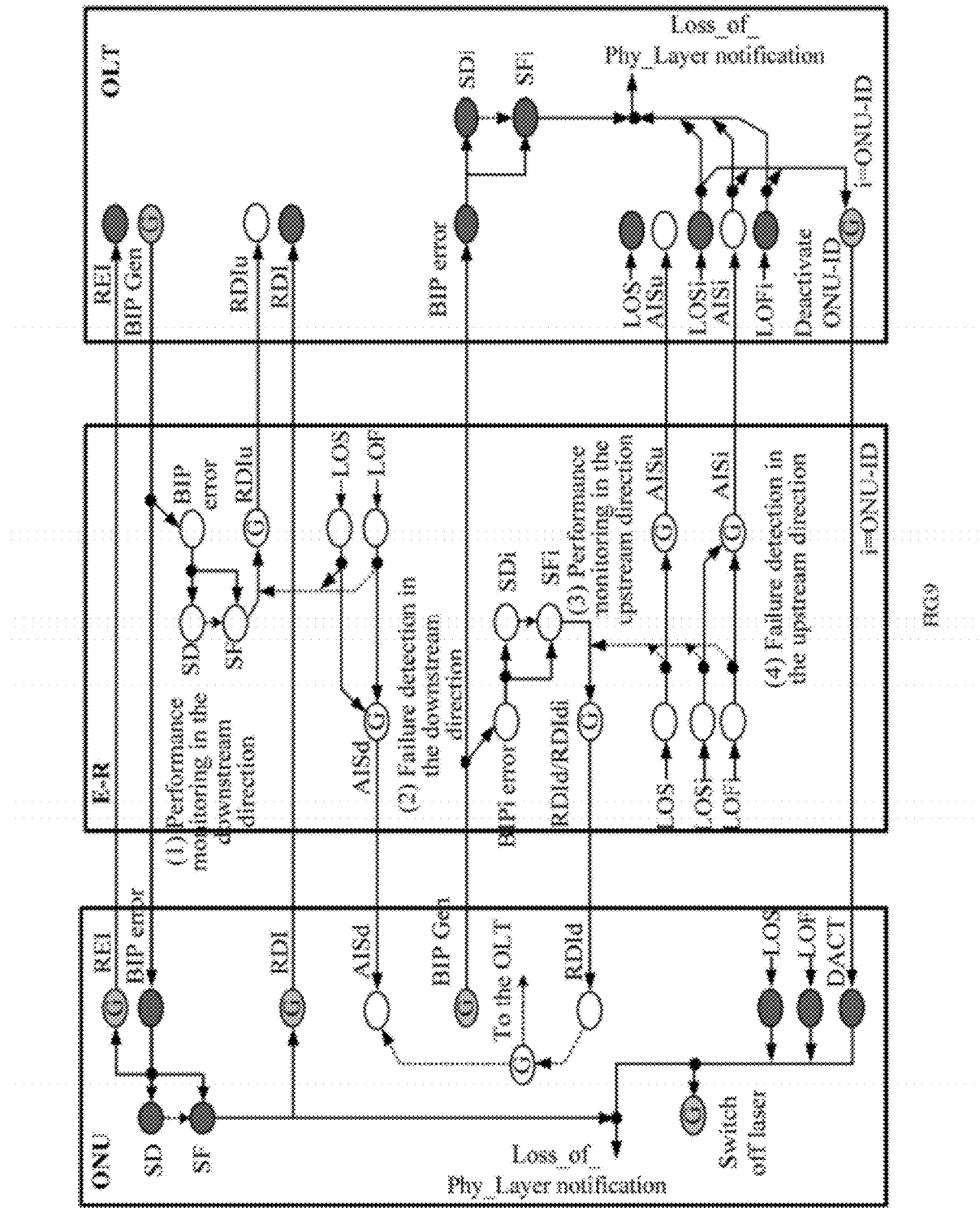
FIG. 9 shows alarm links according to a fourth embodiment of the present invention.

FIG. 9 shows alarm links in the fourth embodiment of the present invention. The features that make this embodiment different from the third embodiment are: The E-R regenerator, the OLT and the ONU are modified, and performance monitoring of data transmission quality and the method for processing the corresponding detected alarms are added.

Downstream Direction:

Unlike the practice in the third embodiment, if the E-R regenerator does not detect any LOS or LOF alarm, the E-R regenerator performs data check for the determined downstream data frame, measures the Bit Error Rate (BER) according to the data check result, and judges whether the BER is higher than the preset BER threshold. If the BER is higher than the preset threshold, the E-R regenerator sends the set third-type downstream AIS to the OLT. The third-type downstream AIS is an RDIu alarm.

Unlike the practice in the third embodiment, after receiving the AISd alarm, the ONU sends the AISd alarm back to the OLT.

According to the received AISd alarm, the OLT determines that a failure leading to LOS or LOF occurs on the downstream path from the OLT to the E-R regenerator.

Upstream Direction:

Unlike the practice in the third embodiment, if the E-R regenerator does not detect any LOS, LOSi or LOFi alarm, the E-R regenerator performs data check for the determined upstream data frame, measures the BER according to the data check result, and judges whether the BER is higher than the preset BER threshold. If the BER is higher than the preset threshold, the E-R regenerator sends the third-type upstream AIS to the ONU. The third-type upstream AIS is an RDId alarm.

According to the received RDId alarm, the ONU determines that a failure leading to increase of the BER of the data frame occurs on the upstream path from the ONU to the E-R regenerator, and attempts to recover the upstream interface processing unit of the ONU.

The ONU sends the received RDId alarm back to the OLT. After receiving the RDId alarm, the OLT determines that a failure leading to increase of the BER of the data frame occurs on the upstream path from the ONU to the E-R regenerator.

In the foregoing process, the ONU may send the AISd alarm and the RDId alarm back to the OLT through a PLOAM message in two modes:

The first mode is to define a new PLOAM message. Table 6 shows a newly defined message for sending back the AISd alarm and the RDId alarm.

TABLE 6

Remote Alarm and Defect Indication Message

| Byte | Content | Description |
|---|---|---|
| 1 | ONU-ID | This byte specifies an ONU. |
| 2 | 00001010 | This byte indicates a message type, and is defined as a "remote alarm and defect indication message". The |

TABLE 6-continued

Remote Alarm and Defect Indication Message

| Byte | Content | Description |
|---|---|---|
|  |  | existing GPON has specified nine types of upstream PLAOM messages. The value of this byte needs to be greater than 9, for example, "00001010". |
| 3 | xxxxxxab | If a = 1, an AISd alarm frame is received; if a = 0, no AISd alarm frame is received; If b = RDId and b = 1, a defect exists (if b = 1, preferably this message needs to be sent for three consecutive times); if b = 0, no defect exists; x: undefined |
| 4-12 | Undefined |  |

The second mode is to use the existing PLOAM message such as an REI message, and use the idle byte in the message to define the AISd alarm and the RDId alarm. Table 7 shows the newly defined AISd alarm and RDId alarm in an REI message.

TABLE 7

Remote Alarm and Defect Indication Message

| Byte | Content | Description |
|---|---|---|
| 1 | ONU-ID | This byte specifies an ONU. |
| 2 | 00001000 | This byte indicates a message type. In the existing GPON, this type is defined as a "remote error indication message". In the LR-PON application, this byte is defined as a "remote alarm and defect indication message". |
| 3 | Error block count 1 | Highest 8 bits of the 32-bit REI counter. |
| 4 | Error block count 2 |  |
| 5 | Error block count 3 |  |
| 6 | Error block count 4 | Lowest 8 bits of the 32-bit REI counter. |
| 7 | 0000ssss | Serial number: The value of ssss increases by 1 once a REI message is sent. |
| 8 | xxxxxxab | In the existing GPON, this byte is undefined. In the LR-PON application, this byte serves as a back-transmission indication signal of the AISd and RDId alarms: If a = 1, an AISd alarm frame is received; if a = 0, no AISd alarm frame is received; If b = RDId and b = 1, a defect exists (if b = 1, preferably this message needs to be sent for three consecutive times); if b = 0, no defect exists; x: undefined |
| 9-12 | Undefined |  |

Specially, when the ONU detects an RDId, it indicates that the transmission performance of the upstream data is degraded. Therefore, even if the data is transmitted through a PLOAM message which provides CRC-8 check, the PLOAM message is preferably sent repeatedly (for example, for three consecutive times) to resist errors and to improve reliability.

The foregoing four embodiments meet different cost requirements and application scenarios, and exert different impacts on the existing functions of the ONU and the OLT. The first embodiment is the simplest and the most cost-efficient. It exerts no impact on the existing functions of the ONU or the OLT in the prior art, involves no modification to the existing ONU or OLT, and is compatible with the existing devices. The second embodiment involves a little modification to the existing OLT, and supports a few new types of alarms. It analyzes, judges and locates the main failures on the path between both sides of the E-R in the LR-PON, and on the path between the ONU and the OLT; and at the same time, it is compatible with the existing ONU. The third and the fourth embodiments involve a little modification to the existing ONU and OLT. The third embodiment considers only the failure detection for the PON signals in the E-R, and does not consider data transmission performance monitoring. The fourth embodiment is the most comprehensive. It adds only three types of alarm signals to the OLT and adds only two types of alarm signals to the ONU, but ensures that the OLT can analyze various alarm signals, locate failures, and implement alarm management and maintenance for the E-R.

A system for managing alarms in an LR-PON system is provided in an embodiment of the present invention. The system includes:

a first PON apparatus, adapted to send a PON signal to the E-R regenerator;

an E-R regenerator, adapted to: obtain the PON signal from the first PON apparatus, check whether the obtained PON signal fails, and notify a second PON apparatus if the PON signal fails; and the second PON apparatus, adapted to: judge and locate the failure according to the received notification and take a corresponding action.

An E-R regenerator is provided in an embodiment of the present invention. The E-R regenerator includes:

a detecting module, adapted to: check whether a PON signal from a first PON apparatus fails, and notify the alarm module to send an alarm to a second PON apparatus if the PON signal fails; and the alarm module, adapted to send an alarm to the second PON apparatus according to the received notification.

The E-R regenerator for managing alarms in an LR-PON system under the present invention is detailed below with reference to exemplary embodiments.

First Apparatus Embodiment

Figure 10:
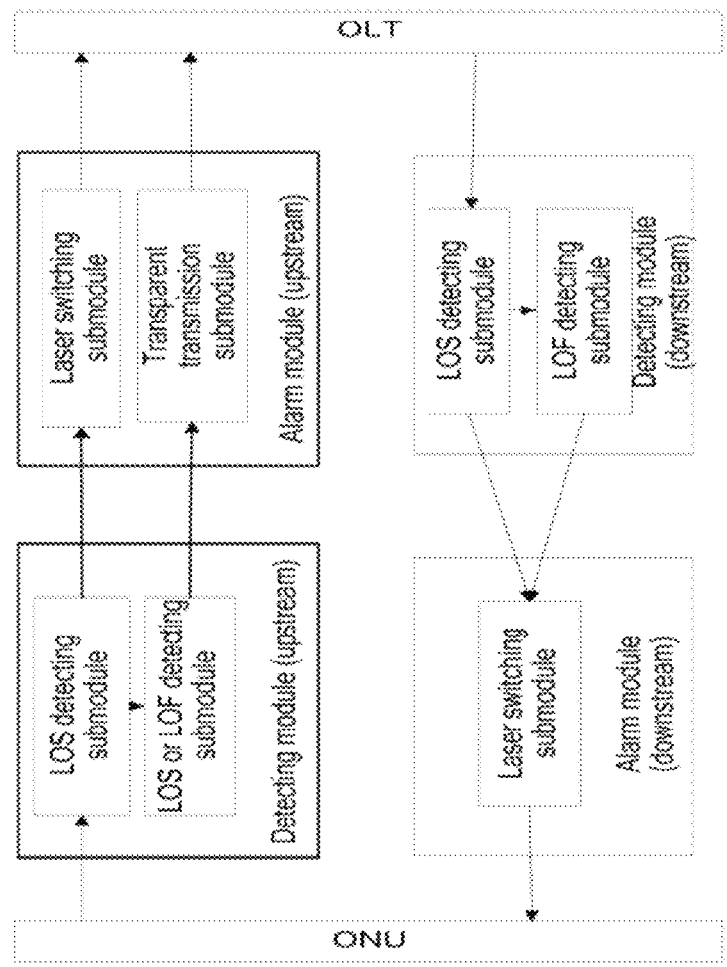
FIG. 10 shows a structure of an E-R regenerator according to the first embodiment of the present invention.

FIG. 10 shows a structure of an E-R regenerator according to the first embodiment of the present invention.

Downstream Direction:

The detecting module includes:

an LOS detecting submodule, adapted to: detect whether LOS occurs in a PON signal obtained from an OLT, and send an LOS notification to the alarm module if LOS occurs.

The alarm module includes:

a laser switching submodule, adapted to switch off the transmitting laser in the downstream direction according to the received LOS notification.

The detecting module may further include:

an LOF detecting submodule, adapted to: perform frame alignment for the electrical signal which is obtained through O/E conversion of the PON signal from the OLT, judge whether LOF occurs, and send an LOF notification to the alarm module if LOF occurs.

The laser switching submodule is further adapted to switch off the transmitting laser in the downstream direction according to the received LOF notification.

Upstream Direction:

The detecting module includes:

an LOS detecting submodule, adapted to: detect whether LOS occurs in the PON signal obtained from the ONU, and send an LOS notification to the alarm module if LOS occurs.

The alarm module includes:

a laser switching submodule, adapted to switch off the transmitting laser in the upstream direction according to the received LOS notification.

The detecting module may further include:

an LOS or LOF detecting submodule, adapted to: perform detection and frame alignment for the electrical signal which is obtained through O/E conversion of the PON signal from the corresponding ONU, judge whether LOS or LOF occurs in the upstream data sent by the corresponding ONU, and send an LOS or LOF notification of the corresponding ONU to the alarm module if LOS or LOF occurs.

The alarm module may further include:

a transparent transmission submodule, adapted to transparently transmit an alarm signal to the OLT according to the received LOS or LOF notification of the corresponding ONU, where the alarm signal indicates that the LOS of the corresponding ONU occurs on the upstream path from the E-R regenerator to the OLT.

The E-R regenerator in this embodiment implements alarm management in the LR-PON system without making any modification to the existing ONU or OLT.

Second Apparatus Embodiment

Figure 11:
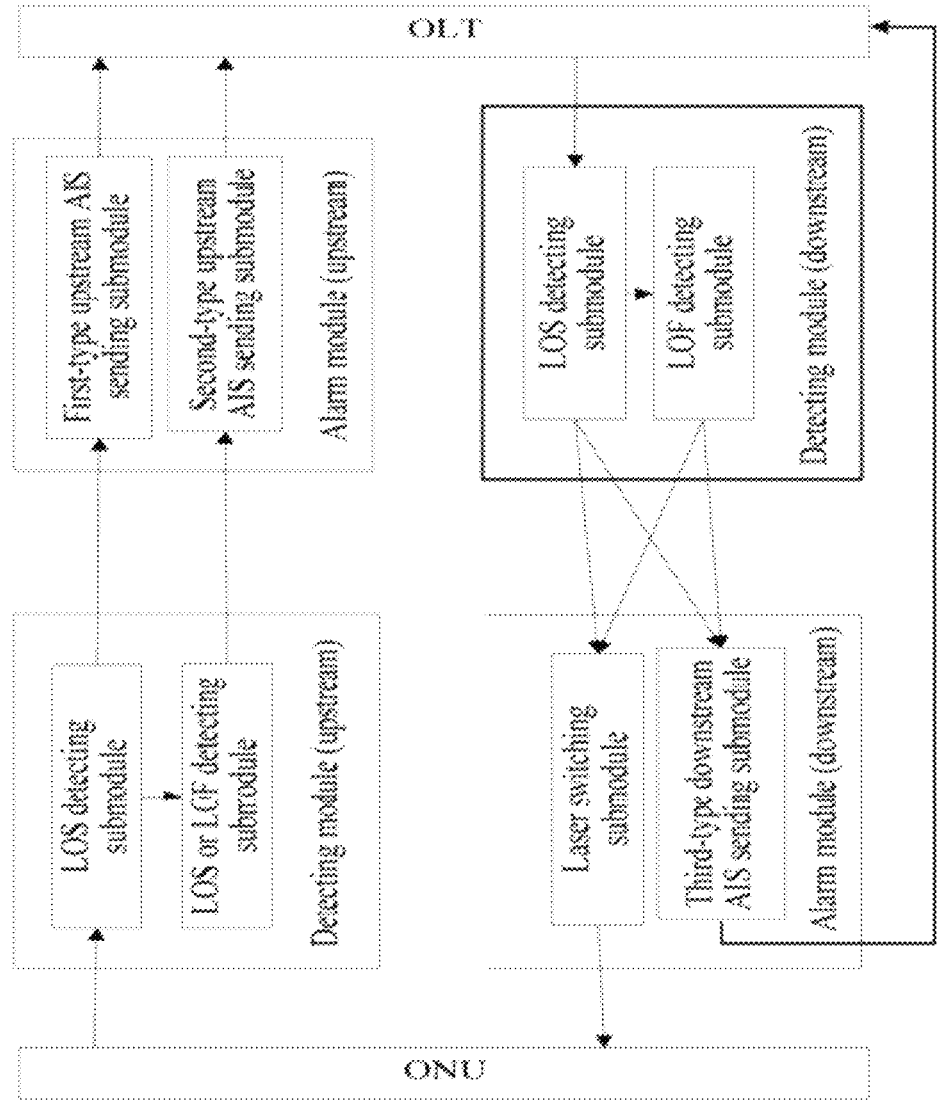
FIG. 11 shows a structure of an E-R regenerator according to the second embodiment of the present invention.

FIG. 11 shows a structure of an E-R regenerator in the second embodiment of the present invention.

Downstream Direction:

Compared with the alarm module in the first apparatus embodiment, the alarm module in this embodiment may further include:

a third-type downstream AIS sending submodule, adapted to send a set third-type downstream AIS back to the OLT according to the received LOS or LOF notification.

Upstream Direction:

As against the alarm module in the first apparatus embodiment, the alarm module in this embodiment may include:

a first-type upstream AIS sending submodule, adapted to send a set first-type upstream AIS to the OLT according to the received LOS notification; and a second-type upstream AIS sending submodule, adapted to send a set second-type upstream AIS to the OLT according to the received LOS or LOF notification.

The E-R regenerator disclosed in this embodiment adds three types of AIS and involves certain modification to the existing OLT, so that the OLT can judge, identify and process the received AIS.

Third Apparatus Embodiment

FIG. 12 shows a structure of an E-R regenerator according to the third embodiment of the present invention.

Downstream Direction:

The detecting module may include:

an LOS detecting submodule, adapted to: detect whether LOS occurs in the PON signal obtained from the OLT, and send an LOS notification to the alarm module if LOS occurs; and an LOF detecting submodule, adapted to: perform frame alignment for the electrical signal which is obtained through O/E conversion of the PON signal from the OLT, judge whether LOF occurs, and send an LOF notification to the alarm module if LOF occurs.

The alarm module may include:

a first-type downstream AIS sending submodule, adapted to send a set first-type downstream AIS to the ONU according to the received LOS or LOF notification; and a third-type downstream AIS sending submodule, adapted to send a set third-type downstream AIS back to the OLT according to the received LOS or LOF notification.

Upstream Direction:

Compared with the alarm module in the second apparatus embodiment, the alarm module in this embodiment may further include:

a third-type upstream AIS sending submodule, adapted to send a set third-type upstream AIS to the corresponding ONU according to the received LOS notification or the received LOS or LOF notification of the corresponding ONU.

The E-R regenerator disclosed in this embodiment adds five types of AIS and involves certain modification to the existing OLT and ONU, so that the OLT and ONU can judge, identify and process the received AIS.

Fourth Apparatus Embodiment

Figure 13:
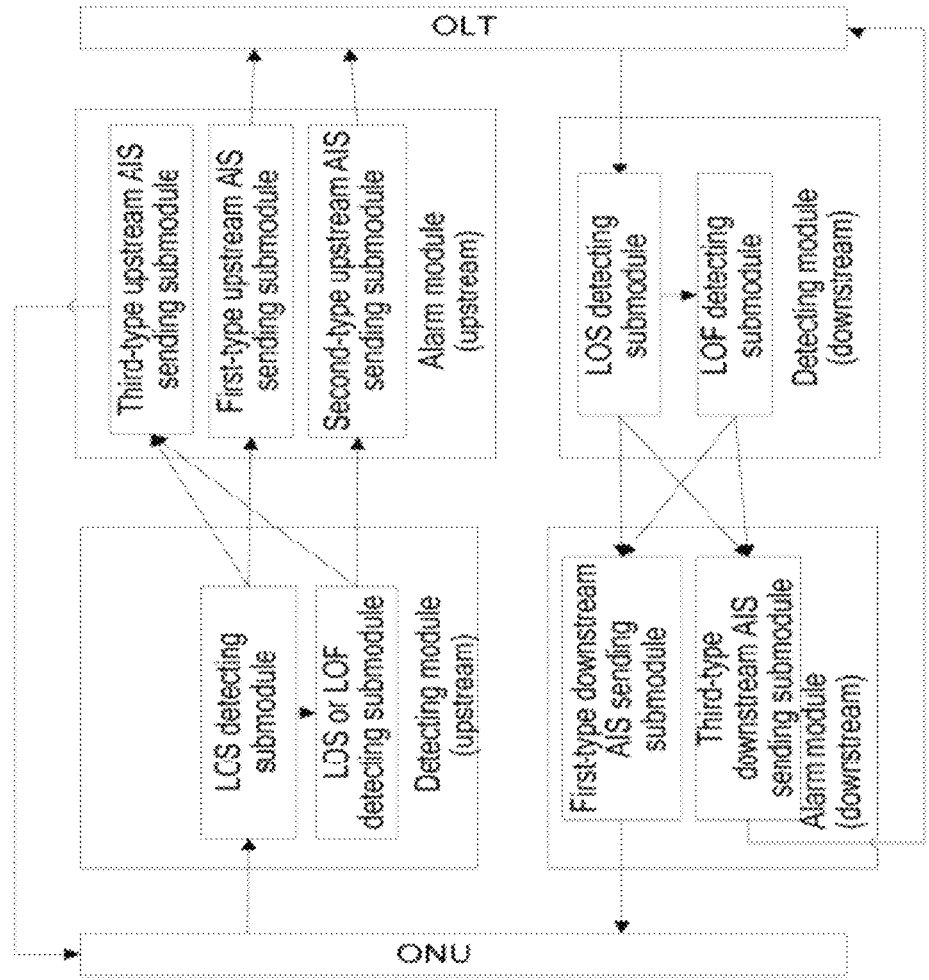
FIG. 13 shows a structure of an E-R regenerator according to the fourth embodiment of the present invention.
Figure 13:
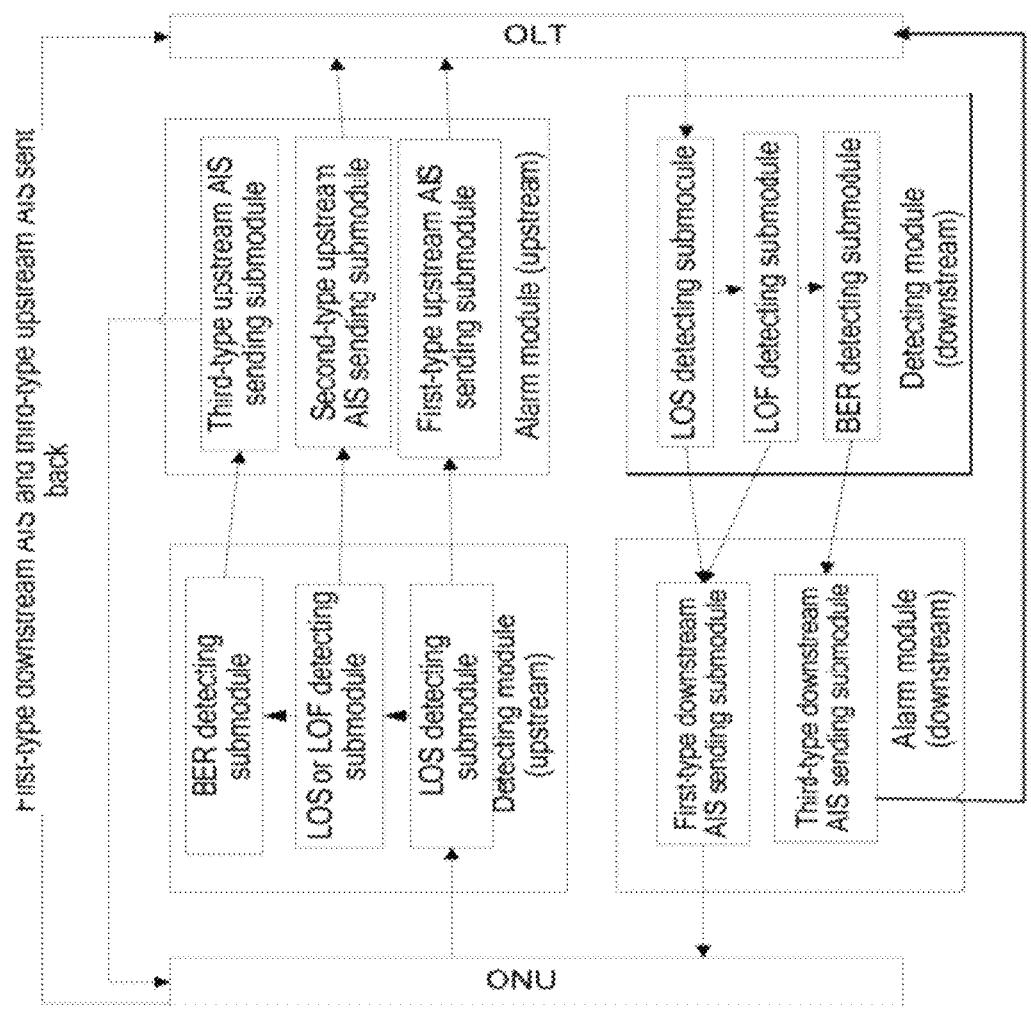

FIG. 13 shows a structure of an E-R regenerator in the fourth embodiment of the present invention.

Downstream Direction:

Compared with the detecting module in the third apparatus embodiment, the detecting module in this embodiment may further include:

a BER detecting submodule, adapted to: perform data check for the determined downstream data frame, measure the BER according to the result of the data check, judge whether the BER is higher than a preset BER threshold, and send a BER excess notification to the alarm module if the BER is higher than the preset threshold; and a third-type downstream AIS sending submodule, adapted to send a set third-type downstream AIS to the OLT according to the received BER excess notification.

Upstream Direction:

Compared with the detecting module in the third apparatus embodiment, the detecting module in this embodiment may further include:

a BER detecting submodule, adapted to: perform data check for the determined downstream data frame, measure the BER according to the result of the data check, judge whether the BER is higher than a preset BER threshold, and send a BER excess notification to the alarm module if the BER is higher than the preset threshold; and a third-type upstream AIS sending submodule, adapted to send a set third-type upstream AIS to the ONU according to the received BER excess notification.

The E-R regenerator disclosed in this embodiment adds five types of AIS, performs failure detection and performance monitoring, and involves certain modification to the existing OLT and ONU, so that the OLT and ONU can judge, identify and process the received AIS.

Evidently, the method, system and apparatus for managing alarms in an LR-PON system under the present invention provide a whole set of alarm management links, and implement main alarm detection and management functions with little modification to the existing ONU and OLT, thus facilitating detection, locating and processing of failures, and saving costs of operation and maintenance. Moreover, different alarm link solutions are disclosed herein to meet different requirements and application scenarios. Further, the alarm links disclosed herein involve little technical difficulty and are easily practicable and cost-efficient, and can satisfy the requirements of the service provider shortly.

Although the invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the claims or their equivalents.

What is claimed is:

1. A method for managing alarms in a Long Reach Passive Optical Network (LR-PON) system, comprising:

obtaining a Passive Optical Network (PON) signal from an Optical Line Terminal (OLT) or an Optical Network Unit (ONU) on one side;

checking whether the obtained PON signal fails and notifying the ONU or the OLT on the other side if the PON signal fails;

by the ONU or the OLT on the other side, judging and locating the failure according to the received notification and taking a corresponding action;

wherein the obtaining of the PON signal from the OLT or the ONU on one side comprises: obtaining the PON downstream optical signal from the OLT;

the checking whether the obtained PON signal fails comprises: judging whether Loss of Signal (LOS) occurs in the obtained PON signal;

the notifying of the ONU or the OLT on the other side comprises: switching off a transmitting laser in a downstream direction, or sending a set first-type downstream Alarm Indication Signal (AIS) to the ONU; and the judging and locating of the failure by the ONU or the OLT on the other side according to the received notification comprise: determining, by the ONU, that a failure leading to the LOS occurs on a downstream path from an Electrical Relay (E-R) regenerator to the ONU if the notification indicates switching off the transmitting laser in the downstream direction; or determining that a failure leading to the LOS or Loss of Frame (LOF) occurs on a downstream path from the OLT to the E-R regenerator if the notification indicates sending the first-type downstream AIS;

obtaining an electrical signal through optical-to-electrical conversion of the PON downstream optical signal from the OLT;

performing frame alignment for a data frame in the obtained electrical signal to judge whether the LOF occurs; and, if a result of the judgment is positive, switching off the transmitting laser in the downstream direction; and determining, by the ONU, that the failure leading to the LOS occurs on the downstream path from the E-R regenerator to the ONU, and taking the corresponding action; or if the result of the judgment is positive, sending the set first-type downstream AIS to the ONU; and determining, by the ONU, that the failure leading to the LOS or LOF occurs on the downstream path from the OLT to the E-R regenerator.

2. The method of claim 1, further comprising:

performing data check for a downstream data frame obtained from the frame alignment, measuring a Bit Error Rate (BER) according to a result of the data check, judging whether the BER is higher than a preset BER threshold, and sending a set third-type downstream AIS to the OLT if the a result of the judgment is positive; and determining, by the OLT, that a failure leading to increase of the BER of the data frame occurs on the downstream path from the OLT to the E-R regenerator.

3. The method of claim 1, further comprising:

sending, by the ONU, the received first-type downstream AIS back to the OLT; and determining, by the OLT, that the failure leading to the LOS or LOF occurs on the downstream path from the OLT to the E-R regenerator.

4. A method for managing alarms in a Long Reach Passive Optical Network (LR-PON) system, comprising:
obtaining a Passive Optical Network (PON) signal from an Optical Line Terminal (OLT) or an Optical Network Unit (ONU) on one side;
checking whether the obtained PON signal fails and notifying the ONU or the OLT on the other side if the PON signal fails;
by the ONU or the OLT on the other side, judging and locating the failure according to the received notification and taking a corresponding action;
wherein the obtaining of the PON signal from the OLT or the ONU on one side comprises: obtaining a PON upstream optical signal from the ONU;
the checking whether the obtained PON signal fails comprises: judging whether Loss of Signal (LOS) occurs in the obtained PON signal;
the notifying of the ONU or the OLT on the other side comprises: switching off a transmitting laser in an upstream direction, or sending a set first-type upstream Alarm Indication Signal (AIS) to the OLT; and
the judging and locating of the failure by the ONU or the OLT on the other side according to the received notification comprise: determining, by the OLT, that a failure leading to the LOS occurs on an upstream path from an Electrical Relay (E-R) regenerator to the OLT if the notification indicates switching off the transmitting laser in the upstream direction; or determining that a failure leading to the LOS occurs on an upstream path from the ONU to the E-R regenerator if the notification indicates sending the first-type upstream AIS;
obtaining an electrical signal through optical-to-electrical conversion of the PON upstream optical signal from the ONU;
performing detection and frame alignment for a data frame in the obtained electrical signal to judge whether the LOS or Loss of Frame (LOF) occurs in upstream data sent by the corresponding ONU; and, if a result of the judgment is positive, transmitting an alarm signal to the OLT transparently, wherein the alarm signal indicates that the LOS of the corresponding ONU occurs on the upstream path from the E-R regenerator to the OLT; and determining, by the OLT, that the failure leading to the LOS of the corresponding ONU occurs on the upstream path from the E-R regenerator to the OLT, and taking the corresponding action; or
if the result of the judgment is positive, sending a set second-type upstream AIS to the OLT; and determining, by the OLT, that the failure leading to the LOS or LOF occurs on the upstream path from the ONU to the E-R regenerator.

5. The method of claim 4, further comprising:
if the result of the judgment is positive, sending a set third-type upstream AIS to the ONU; and
determining, by the ONU, that a failure occurs on the upstream path from the ONU to the E-R regenerator and that the failure leads to the LOS of a whole data stream or leads to the LOS or LOF in the upstream data sent by the corresponding ONU.

6. The method of claim 4, further comprising:
performing data check for an upstream data frame obtained from the frame alignment, measuring a Bit Error Rate (BER) according to a result of the data check, judging whether the BER is higher than a preset BER threshold, and sending a set third-type upstream AIS to the ONU if the a result of the judgment is positive; and
determining, by the ONU, that a failure leading to increase of the BER of the data frame occurs on the upstream path from the ONU to the E-R regenerator.

7. The method of claim 6, further comprising:
sending, by the ONU, the received third-type upstream AIS back to the OLT; and
determining, by the OLT, that the failure leading to the increase of the BER of the data frame occurs on the upstream path from the ONU to the E-R regenerator.

8. An Electrical Relay (E-R) regenerator, comprising:
a detecting module, adapted to: check whether a Passive Optical Network (PON) signal from a first PON apparatus fails and notify an alarm module to send an alarm to a second PON apparatus if the PON signal fails;
the alarm module, adapted to send the alarm to the second PON apparatus according to the received notification;
the detecting module comprises: a Loss of Signal (LOS) detecting submodule, adapted to: detect whether LOS occurs in the PON signal obtained from an Optical Line Terminal (OLT), and send an LOS notification to the alarm module if the LOS occurs;
the alarm module comprises: a laser switching submodule adapted to switch off a transmitting laser in a downstream direction according to the received LOS notification; or, a first-type downstream Alarm Indication Signal (AIS) sending submodule, adapted to send a set first-type downstream AIS to an Optical Network Unit (ONU) according to the received LOS notification;
the detecting module further comprises: a Loss of Frame (LOF) detecting submodule, adapted to: perform frame alignment for an electrical signal which is obtained through optical-to-electrical conversion of the PON signal from the OLT, judge whether LOF occurs, and send an LOF notification to the alarm module if the LOF occurs; and
the laser switching submodule of the alarm module is further adapted to: switch off the transmitting laser in the downstream direction according to the received LOF notification; or, the first-type downstream AIS sending submodule of the alarm module is further adapted to send the set first-type downstream AIS to the ONU according to the received LOF notification.

9. The E-R regenerator of claim 8, wherein
the detecting module further comprises: a Bit Error Rate (BER) detecting submodule, adapted to: perform data check for a downstream data frame obtained after the frame alignment, measure a BER according to a result of the data check, judge whether the BER is higher than a preset BER threshold, and send a BER excess notification to the alarm module if the BER is higher than the preset threshold; and
the alarm module further comprises: a third-type downstream AIS sending submodule, adapted to send a set third-type downstream AIS to the OLT according to the received BER excess notification.

10. An Electrical Relay (E-R) regenerator, comprising:
a detecting module, adapted to: check whether a Passive Optical Network (PON) signal from a first PON apparatus fails, and notify an alarm module to send an alarm to a second PON apparatus if the PON signal fails;
the alarm module, adapted to send the alarm to the second PON apparatus according to the received notification;

the detecting module comprises: a Loss of Signal (LOS) detecting submodule, adapted to: detect whether LOS occurs in the PON signal obtained from an Optical Network Unit (ONU), and send an LOS notification to the alarm module if the LOS occurs;

the alarm module comprises: a laser switching submodule, adapted to switch off a transmitting laser in an upstream direction according to the received LOS notification; or a first-type upstream Alarm Indication Signal (AIS) sending submodule, adapted to send a set first-type upstream AIS to an Optical Line Terminal (OLT) according to the received LOS notification;

the detecting module further comprises: an LOS or Loss of Frame (LOF) detecting submodule, adapted to: perform detection and frame alignment for an electrical signal which is obtained through optical-to-electrical conversion of the PON signal from a corresponding ONU, judge whether the LOS or LOF occurs in upstream data sent by the corresponding ONU, and send the LOS notification or an LOF notification of the corresponding ONU to the alarm module if the LOS or LOF occurs; and the alarm module further comprises: a transparent transmission submodule, adapted to transparently transmit an alarm signal to the OLT according to the received LOS notification or LOF notification of the corresponding ONU, wherein the alarm signal indicates that the LOS of the corresponding ONU occurs on an upstream path from the E-R regenerator to the OLT; or, a second-type upstream AIS sending submodule, adapted to send a set second-type upstream AIS to the OLT according to the received LOS notification or LOF notification of the corresponding ONU.

11. The E-R regenerator of claim 10, wherein the alarm module further comprises:

a third-type upstream AIS sending submodule, adapted to send a set third-type upstream AIS to the corresponding ONU according to the received LOS notification or the received LOS or LOF notification of the corresponding ONU.

12. The E-R regenerator of claim 10, wherein:

the detecting module further comprises: a Bit Error Rate (BER) detecting submodule, adapted to: perform data check for an upstream data frame obtained after the frame alignment, measure a BER according to a result of the data check, judge whether the BER is higher than a preset BER threshold, and send a BER excess notification to the alarm module if the BER is higher than the preset threshold; and the alarm module further comprises: a third-type upstream AIS sending submodule, adapted to send a set third-type upstream AIS to the ONU according to the received BER excess notification.

* * * * *